(12) United States Patent  
Kumazawa

(10) Patent No.: US 6,968,436 B2  
(45) Date of Patent: Nov. 22, 2005

(54) MEMORY CONTROLLER THAT CONTROLS SUPPLY TIMING OF READ DATA

(75) Inventor: Makoto Kumazawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 09/814,981

(22) Filed: Mar. 23, 2001

(65) Prior Publication Data

US 2002/0040424 A1 Apr. 4, 2002

(30) Foreign Application Priority Data

Oct. 3, 2000 (JP) .............................. 2000-303554

(51) Int. Cl.$^7$ ............................................. G06F 12/00
(52) U.S. Cl. ...................... 711/167; 713/401; 713/503; 365/194
(58) Field of Search ................ 713/400, 401, 713/500–503; 711/167; 714/744, 731, 719, 714/700; 365/194, 233, 193

(56) References Cited

U.S. PATENT DOCUMENTS

| | | | | |
|---|---|---|---|---|
| 5,935,257 A | * | 8/1999 | Nishimura | 713/503 |
| 5,946,712 A | * | 8/1999 | Lu et al. | 711/167 |
| 6,108,795 A | * | 8/2000 | Jeddeloh | 713/401 |
| 6,137,734 A | * | 10/2000 | Schoner et al. | 365/194 |
| 6,175,928 B1 | * | 1/2001 | Liu et al. | 713/401 |
| 6,202,168 B1 | * | 3/2001 | Saito et al. | 713/400 |
| 6,239,629 B1 | * | 5/2001 | Erickson | 327/141 |
| 6,240,042 B1 | * | 5/2001 | Li | 365/233 |
| 6,247,137 B1 | * | 6/2001 | Wickeraad | 713/401 |
| 6,269,451 B1 | * | 7/2001 | Mullarkey | 713/401 |
| 6,316,980 B1 | * | 11/2001 | Vogt et al. | 713/401 |
| 6,330,683 B1 | * | 12/2001 | Jeddeloh | 713/401 |
| 6,407,583 B2 | * | 6/2002 | Saito | 713/400 |
| 6,434,081 B1 | * | 8/2002 | Johnson et al. | 365/233 |
| 6,453,402 B1 | * | 9/2002 | Jeddeloh | 711/167 |
| 6,480,946 B1 | * | 11/2002 | Tomishima et al. | 711/167 |
| 6,636,955 B1 | * | 10/2003 | Kessler et al. | 711/167 |
| 2001/0013802 A1 | * | 8/2001 | Faulcon et al. | 327/244 |

* cited by examiner

Primary Examiner—B. James Peikari  
Assistant Examiner—Woo H. Choi  
(74) Attorney, Agent, or Firm—Arent Fox PLLC

(57) ABSTRACT

A method for supplying a data signal read from a memory to an internal circuit of a semiconductor integrated circuit is described. First, supply timing information determining supply timing of the data signal provided to the internal circuit is generated using the data signal read from the memory. Then, the data signal read from the memory is supplied to the internal circuit in accordance with the supply timing information, so that data is provided at proper timing even if surrounding environment or a clock frequency is changed.

19 Claims, 15 Drawing Sheets

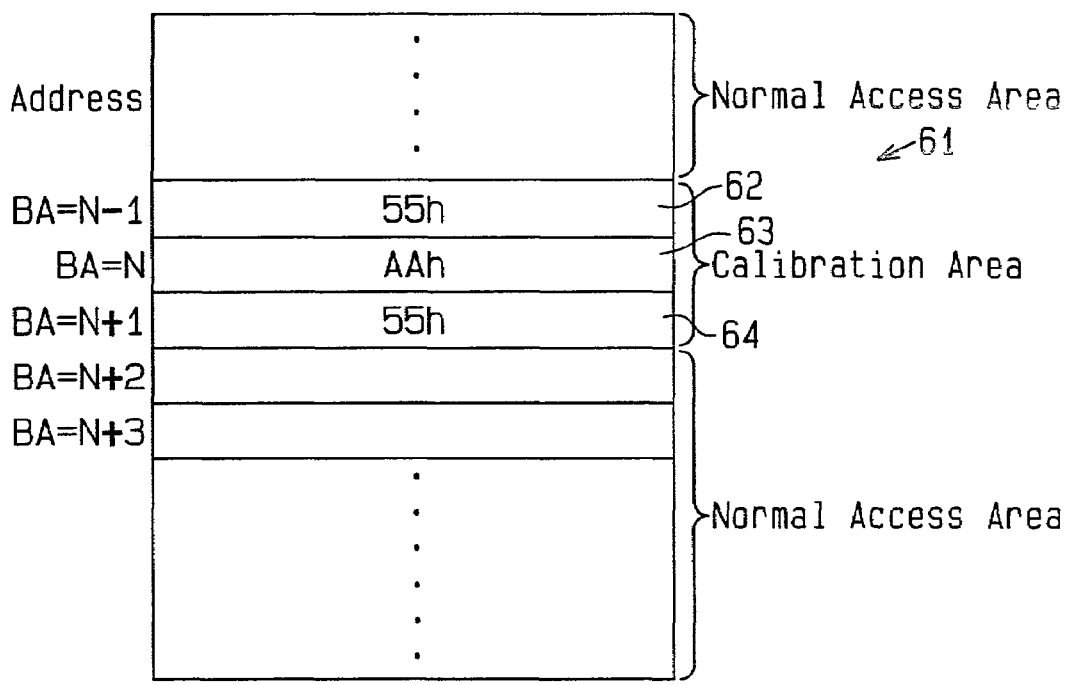

MEMORY CONTROLLER THAT CONTROLS SUPPLY TIMING OF READ DATA

BACKGROUND OF THE INVENTION

The present invention relates to a semiconductor integrated circuit device, and, more particularly, to a memory controller installed in the semiconductor integrated circuit device for controlling memory data read and write.

FIG. 1 is a schematic block diagram of a conventional system LSI (large scale integrated circuit) 100. The system LSI 100 includes a memory 1 such as a DRAM and a semiconductor integrated circuit device (LSI) 2 connected to the memory 1. The LSI 2 includes a CPU 3, a function macro or an internal circuit 4 accessing the memory 1, such as a peripheral circuit, and a control circuit or a memory controller 5 controlling the access of the function macro 4. The memory 1 provides and receives a predetermined signal via internal wiring and external wiring of the LSI 2.

The function macro 4 provides a read/write signal W/R determining an access method, an access request signal REQ, write data WDATA 7:0 (7:0 indicate 7 to 0), and address signals A 22:0 to the memory controller 5. The memory controller 5 provides read data RDATA 7:0 and an acknowledge signal ACK indicating output timing of the read data (input timing of the function macro) to the function macro 4.

FIG. 2 is a schematic block diagram of the memory controller 5 of FIG. 1. The memory controller 5 includes a control circuit 11, an output buffer 12, an input buffer 13, and a flip-flop 14.

The control circuit 11 controls the output buffer 12, which is a three-state buffer, in accordance with the read/write signal W/R so that output data and input data do not conflict. The control circuit 11 provides an internal clock signal ICLK generated using a clock signal CLK_CON to the flip-flop 14. The flip-flop 14 latches the input data provided from the input buffer 13 in response to the internal clock signal ICLK and provides the latched input data or the read data RDATA 7:0 to the function macro 4. Further, the control circuit 11 provides the acknowledge signal ACK to the function macro 4.

FIG. 3 is a timing diagram in the case where data is read from the memory 1 in which CAS latency (CL) is 2. In FIG. 3, various signals transferred between the memory 1 and the memory controller 5 are described using codes of terminals to which corresponding signals are provided. Therefore, changes of the various signals are represented according to a change of a signal in each terminal.

When the request signal REQ is provided to the memory controller 5 at timing (−1), the memory controller 5 issues a first read command (RD1) at the T1 cycle in response to the rising edge of the clock signal CLK_CON. The memory 1 receives a clock signal CLK_DR and a read command RD1 and outputs data (D1) (a data signal D_DR) at a read address BA1 being a time tAC late from the rising edge of the clock signal CLK_DR in response to the read command RD1. The time tAC is necessary for a data output operation of the memory 1. The memory controller 5 receives the data D1 (a data signal D_CON) read from the memory 1 at the T3 cycle.

The internal wiring of the LSI 2 and the external wiring between the LSI 2 and the memory 1 generate a first delay time tD1 when a signal is supplied from the memory controller 5 to the memory 1 and generate a second delay time tD2 when a signal is supplied from the memory 1 to the memory controller 5.

When the cycle of the clock signal CLK_CON is sufficiently long compared with the first and second delay times tD1 and tD2, the memory controller 5 can acquire the data signal D_CON (data D1) at the T3 cycle. Therefore, the memory controller 5 asserts the acknowledge signal ACK matching the acquisition at the T3 cycle. When the acknowledge signal ACK is asserted, the function macro 4 acquires the data D1 in response to the rising edge of the internal clock signal ICLK.

The CPU 3 provides a mode switching signal MODE to the function macro 4 and the memory controller 5 based on the operating state of the LSI 2. The function macro 4 and the memory controller 5 decrease an operation clock frequency in accordance with the mode switching signal MODE. This operation reduces the power consumption of the LSI 2.

The first and second delay times tD1, tD2 depend on the layouts and connection wiring of the LSI 2 and the memory 1. Therefore, when the frequencies of the clock signals CLK_CON, CLK_DR, ICLK increase due to the fast operation speed of the LSI 2, as shown in FIG. 4, the memory controller 5 can acquire the data D_CON only at the T4 cycle or later. The control circuit 11 needs to assert the acknowledge signal ACK at the T4 cycle that is delayed to the extent of one clock cycle.

The first and second delay times tD1, tD2 fluctuate due to a temperature change of operating environment and manufacturing dispersion. When the delay times tD1, tD2 are relatively prolonged or the frequency of the clock signal CLK_CON increases, as shown in FIG. 5, a changing point of the data D_CON and a changing point of the internal clock signal ICLK of the memory controller may close each other. In this case, the setup time of the data D_CON is not sufficiently secured when the internal clock signal ICLK rises, and the function macro 4 cannot stably acquire data.

When the wiring delay times tD1, tD2 are further prolonged or the frequency of the clock signal CLK_CON further increases, as shown in FIG. 6, the memory controller 5 can acquire data at the T5 cycle or later. As shown in FIG. 4, however, when the acknowledge signal ACK is asserted at the T4 cycle, the function macro 4 cannot acquire the data D1. Therefore, assert timing of the acknowledge signal ACK needs to be changed so that data can stably be acquired.

The acquiring point of data (assert timing of the ACK signal) against a fluctuation of the wiring delay time and the application of a clock signal to a high frequency is changed by setting a register or controlling switches of the memory controller 5 by the CPU 3.

The output timing of the data (D_CON) from the memory controller 5, however, dynamically or irregularly changes due to the temperature change of operating environment and manufacturing dispersion. Further, the wiring delay times tD1, tD2 fluctuate and the CLK_CON frequency changes for the purpose of power saving. Therefore, it is difficult to always set an optimum data acquiring point of the function macro 4 (assert timing of the ACK signal) in accordance with these changes.

SUMMARY OF THE INVENTION

An object of the present invention is to provide a memory controller that provides data at proper timing even if surrounding environment or a clock frequency is changed.

In a first aspect of the present invention, a method for supplying a data signal read from a memory to an internal circuit of a semiconductor integrated circuit is provided. First, supply timing information determining supply timing of the data signal provided to the internal circuit is generated using the data signal read from the memory. Then, the data signal read from the memory is supplied to the internal circuit in accordance with the supply timing information.

In a second aspect of the present invention, a memory controller providing a data signal read from a memory to an internal circuit of a semiconductor integrated circuit is provided. The memory controller includes a control circuit connected to the memory for providing a read request signal for reading the data signal to the memory. A data selection circuit is connected to the memory to receive the data signal read from the memory in response to the read request signal and generate supply timing information for determining supply timing of the data signal provided to the internal circuit using the data signal.

In a third aspect of the present invention, a semiconductor integrated circuit device accesses to a memory. The semiconductor integrated circuit device includes an internal circuit, and a memory controller connected between the memory and the internal circuit, for providing a data signal read from the memory to the internal circuit. The memory controller includes a control circuit connected to the memory, for providing a read request signal for reading the data signal to the memory. A data selection circuit is connected to the memory to receive the data signal read from the memory in response to the read request signal and generate supply timing information for determining the supply timing of the data signal provided to the internal circuit using the data signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 14 is a diagram for describing an address map of a memory;

FIG. 15 is a schematic diagram of a memory;

DETAILED DESCRIPTION OF THE PREFERRED EMBODIMENTS

Figure 1:
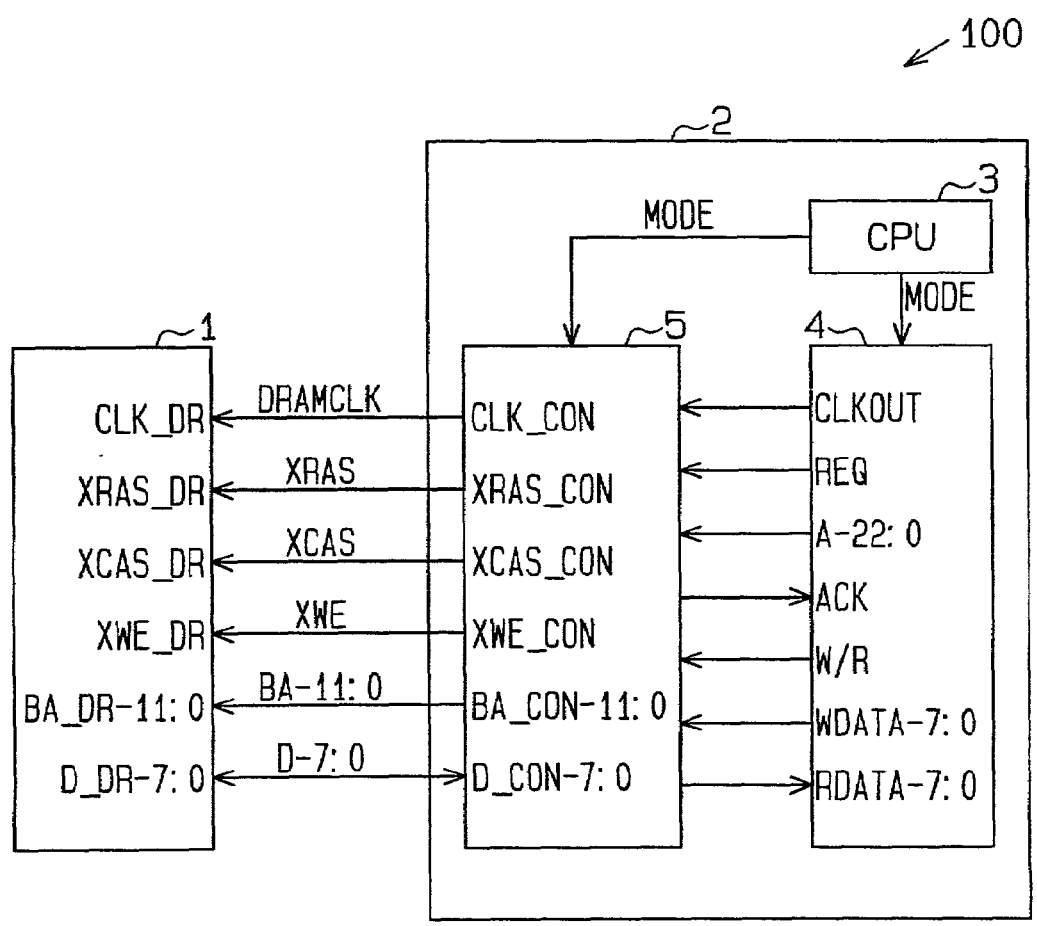
FIG. 1 is a schematic block diagram of a system LSI of the prior art.
Figure 2:
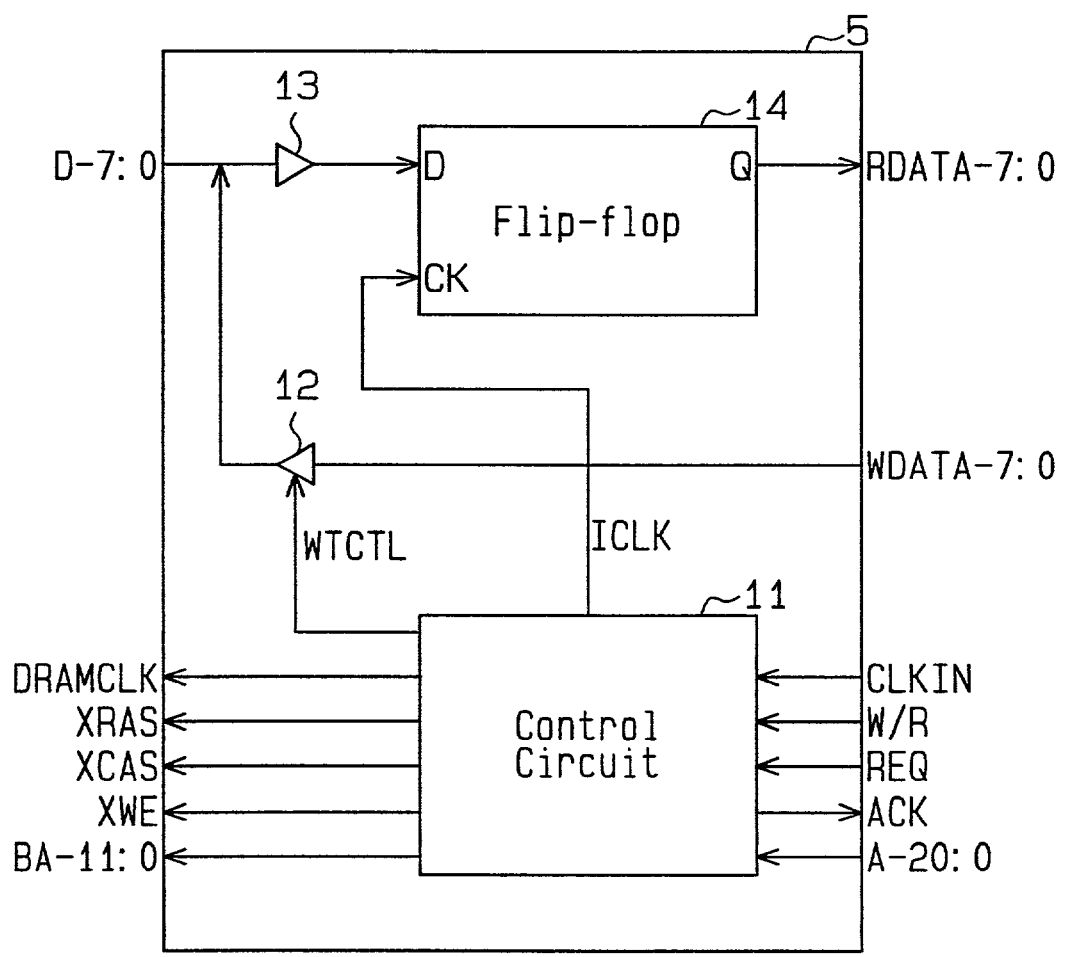
FIG. 2 is a schematic block diagram of a memory controller of the system LSI of FIG. 1.
Figure 3:
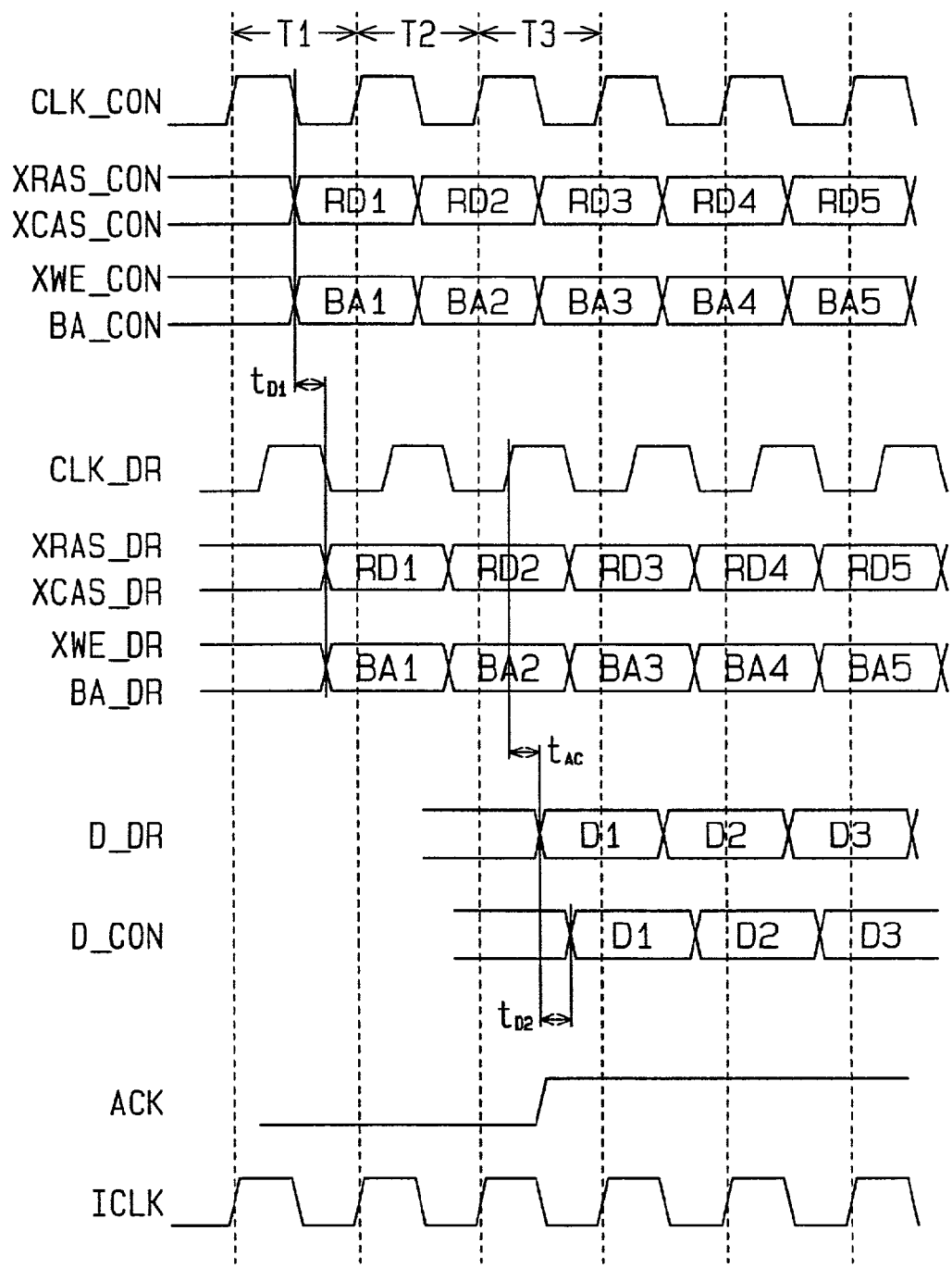
FIG. 3 is a timing chart for describing a first example of the data read operation of the system LSI of FIG. 1.
Figure 4:
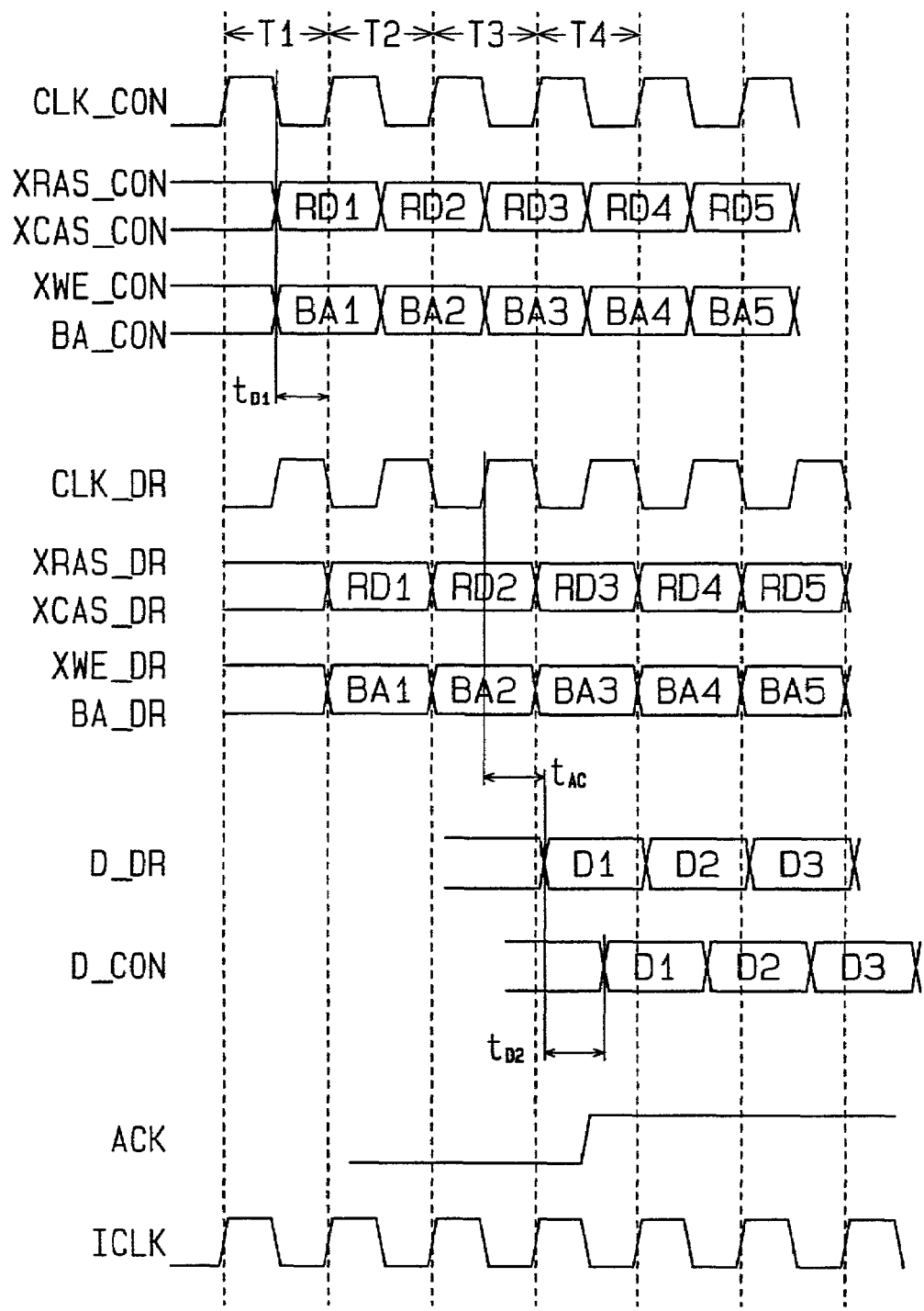
FIG. 4 is a timing chart for describing a second example of the data read operation of the system LSI of FIG. 1.
Figure 5:
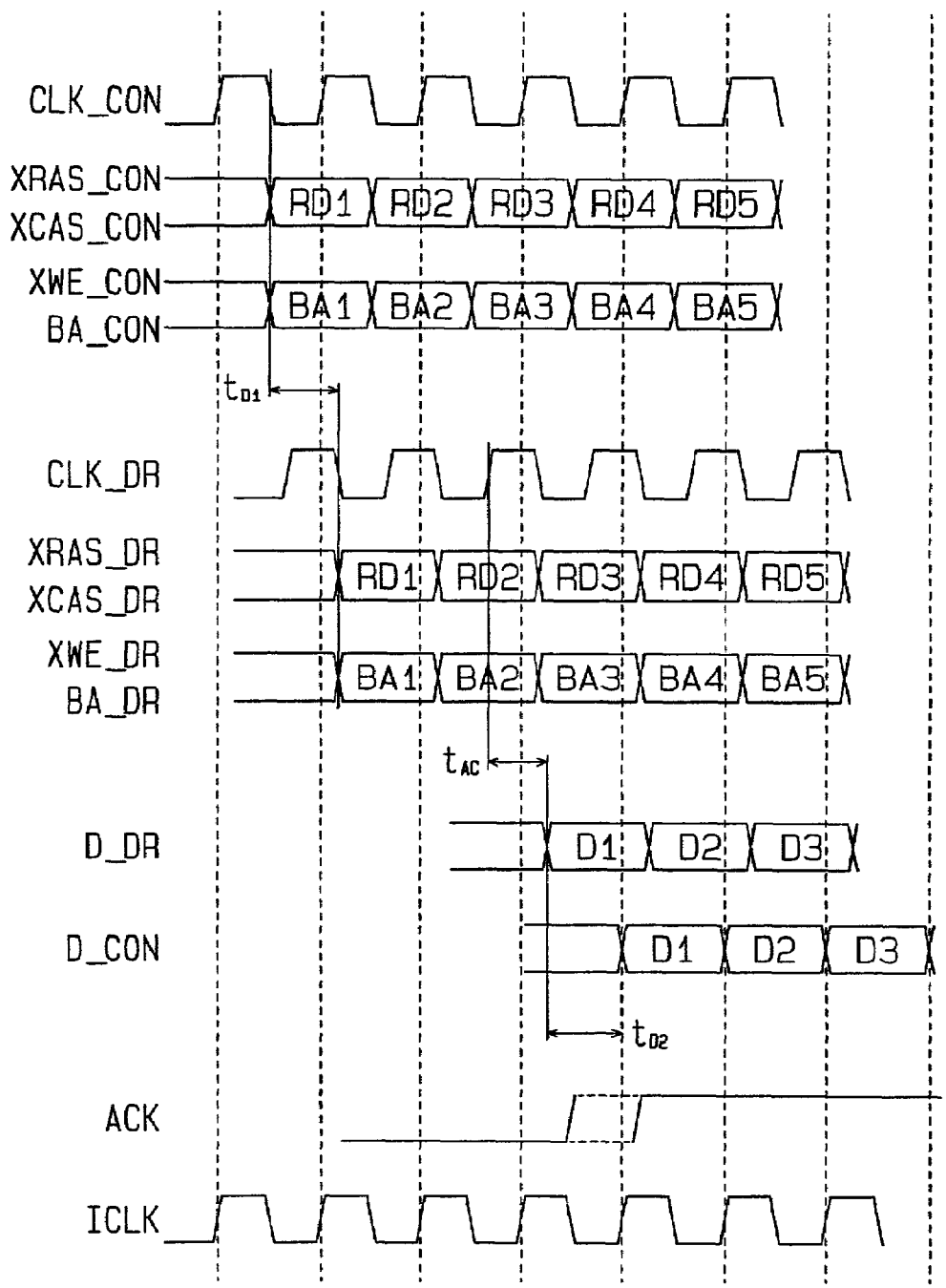
FIG. 5 is a timing chart for describing a third example of the data read operation of the system LSI of FIG. 1.
Figure 6:
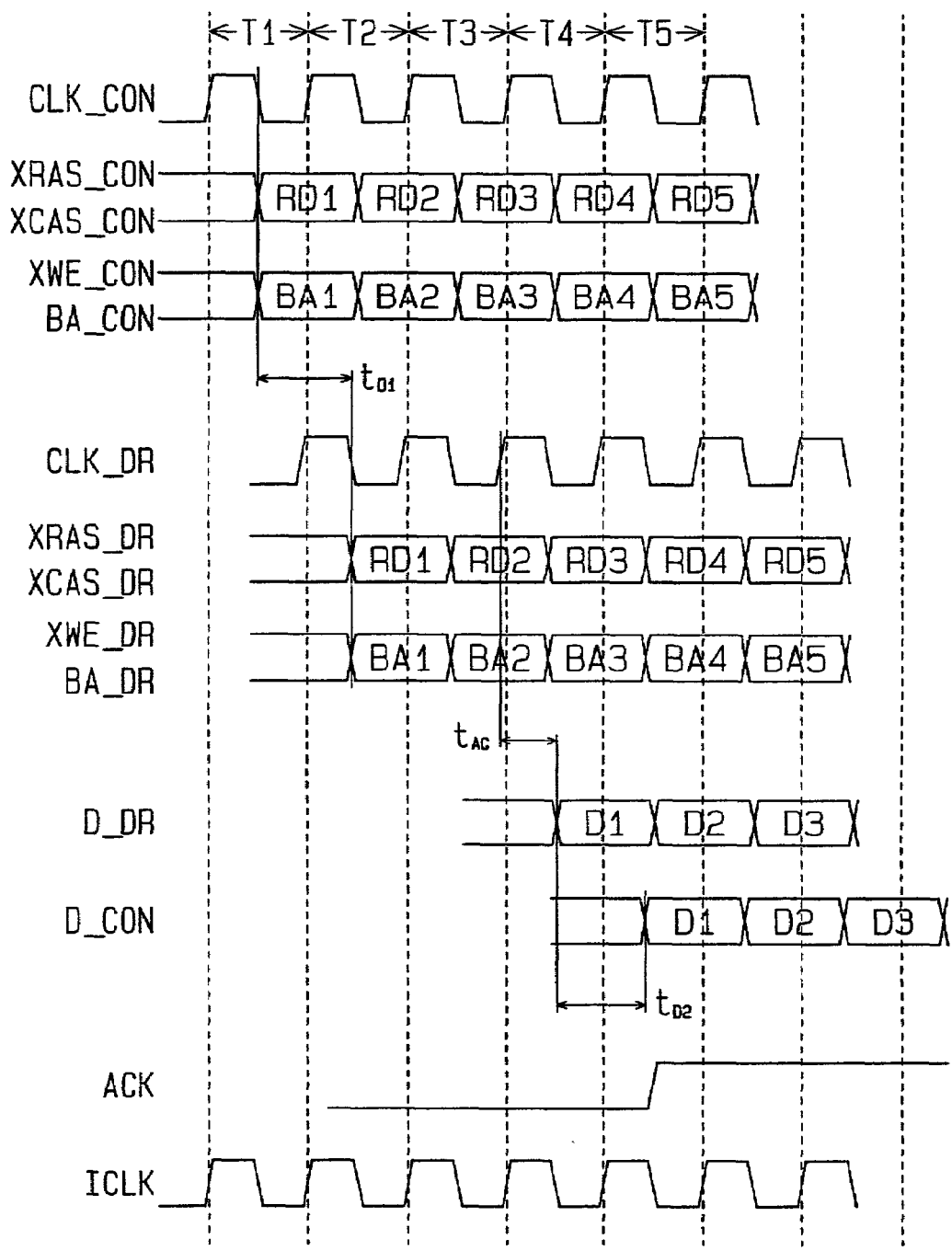
FIG. 6 is a timing chart for describing a fourth example of the data read operation of the system LSI of FIG. 1.
Figure 7:
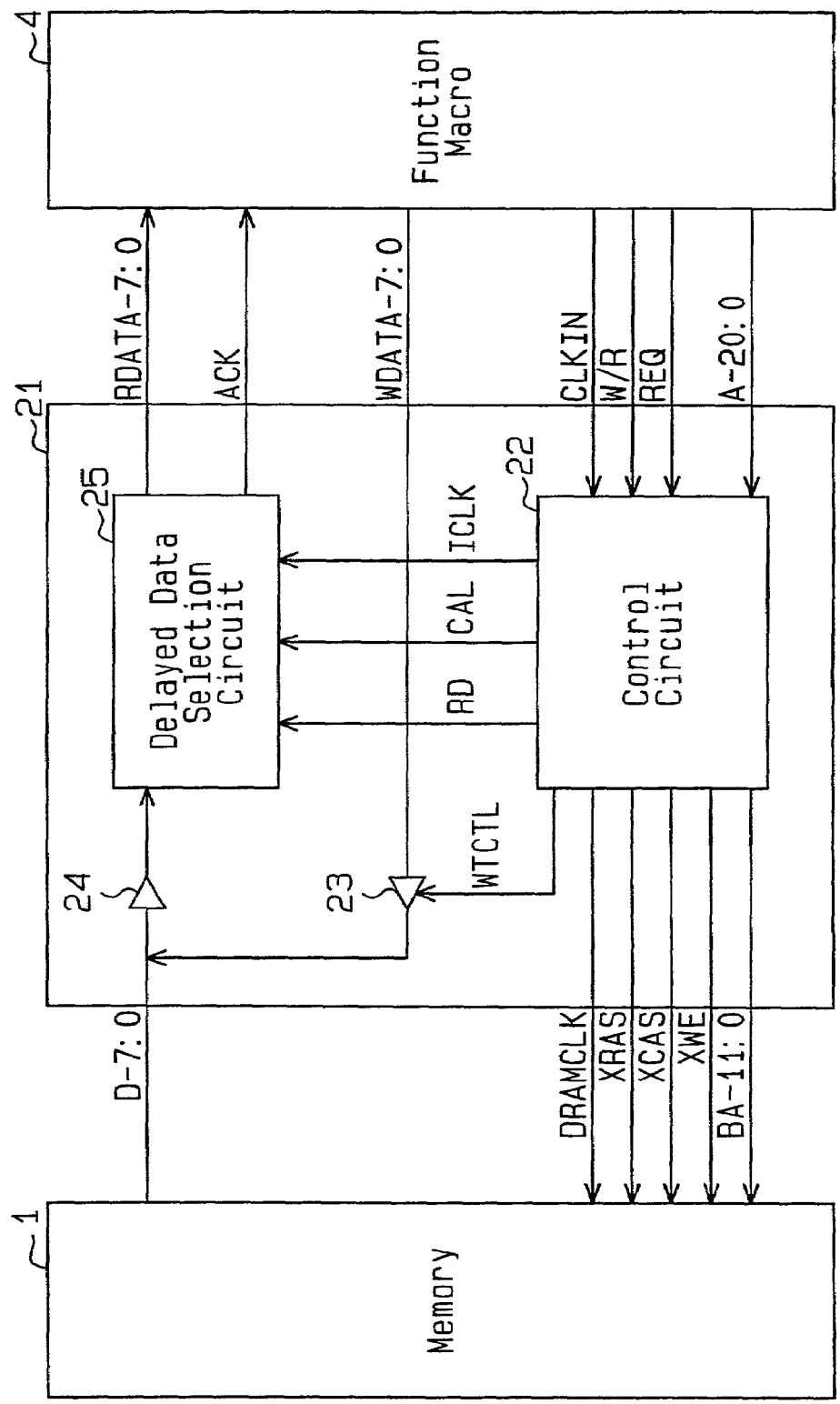
FIG. 7 is a schematic block diagram of a memory controller according to one embodiment of the present invention.

As shown in FIG. 7, a memory controller 21 according to one embodiment of the present invention includes a control circuit 22, an output buffer 23, an input buffer 24 and a delayed data selection circuit 25. The memory controller 21 is installed in the LSI 2 instead of the memory controller 5 of FIG. 1.

The control circuit 22 receives a clock signal CLKIN, a read/write signal W/R, a request signal REQ and address signals A 20:0 from a function macro 4. The control circuit 22 uses an input signal to generate a clock signal DRAMCLK and provides the clock signal DRAMCLK, and various signals XRAS, XCAS, XWE for instructing commands and address signals BA11:0 to the memory 1 to perform a read/write access from and to the memory 1.

The control circuit 22 generates a gate control signal WTCTL in response to the read/write signal W/R and provides the gate control signal WTCTL to the output buffer 23.

The output buffer 23, which is preferably a three-state buffer, amplifies write data WDATA7:0 from the function macro 4 and outputs the amplified write data written in the memory 1 in response to the control signal WTCTL. The output buffer 23 sets its output terminal at high impedance in response to the control signal WTCTL when data is read from the memory 1.

The input buffer 24 amplifies read data D 7:0 provided from the memory 1 and provides the amplified read data to the delayed data selection circuit 25.

The control circuit 22 uses the clock signal CLKIN to generate an internal clock signal ICLK and provides the internal clock signal ICLK to the delayed data selection circuit 25. The control circuit 22 provides a correction signal CAL at a predetermined level (for example, high level) to the delayed data selection circuit 25 at the operation start of the LSI 2 and every predetermined time after the operation start of the LSI 2. The control circuit 22 further issues a read command to the memory 1 and, at the same time, provides a high-level command issue signal RD to the delayed data selection circuit 25.

The delayed data selection circuit 25 receives the amplified read data from the input buffer 24, provides read data RDATA 7:0 to the function macro 4, and asserts an acknowledge signal ACK. The delayed data selection circuit 25 performs the output timing calibration processing of the read data RDATA 7:0 and the acknowledge signal ACK in response to the correction signal CAL.

In the timing calibration processing, the control circuit 22 first writes data having an expected value to a predetermined address of the memory 1. Then, the control circuit 22 provides the correction signal CAL to the delayed data selection circuit 25, issues a read command of the data having the predetermined address to the memory 1, and asserts the command issue signal RD.

The delayed data selection circuit 25 receives a read data signal having an expected value from the memory 1 via the input buffer 24 and generates a plurality of delayed data signals differing in a delay time. The delayed data selection circuit 25 selects a delayed data signal suitable for the input timing of the function macro 4 (or output timing of the memory controller 21) from the delayed data signals and temporarily stores selection information (supply timing information) of the delayed data signal and acquisition timing information of the function macro 4.

In the normal operation mode of the memory controller 21, the delayed data selection circuit 25 provides one delayed data signal corresponding to the stored selection information to the function macro 4 as the read data RDATA 7:0 and asserts the acknowledge signal ACK in accordance with the stored acquisition timing information.

The memory controller 21 performs the timing calibration processing in this manner, thereby supplying the read data RDATA 7:0 to the function macro 4 matching the input timing of the function macro 4 (output timing of the memory controller 21), and asserts the acknowledge signal ACK. Therefore, regardless of a fluctuation of a wiring delay time and a frequency change of a clock signal, the supply timing of the read data RDATA 7:0 and the acknowledge signal ACK and the read timing of the function macro 4 substantially match. Hence, the function macro 4 stably acquires the read data RDATA 7:0.

Figure 8:
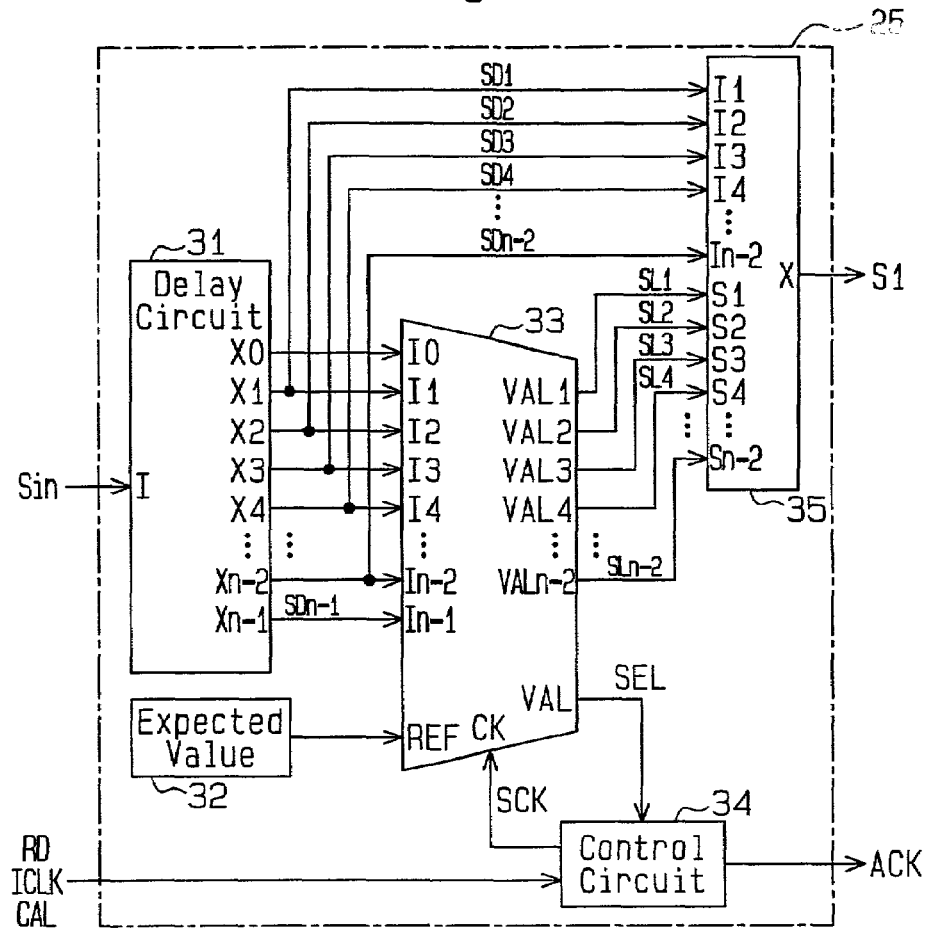
FIG. 8 is a schematic block diagram of a delayed data selection circuit of the memory controller of FIG. 7.

FIG. 8 is a schematic block diagram of the delayed data selection circuit 25 of FIG. 7. The delayed data selection circuit 25 includes a delay circuit 31, a register 32, an optimum data detection circuit 33, a control circuit 34 and a selection circuit 35.

Figure 9:
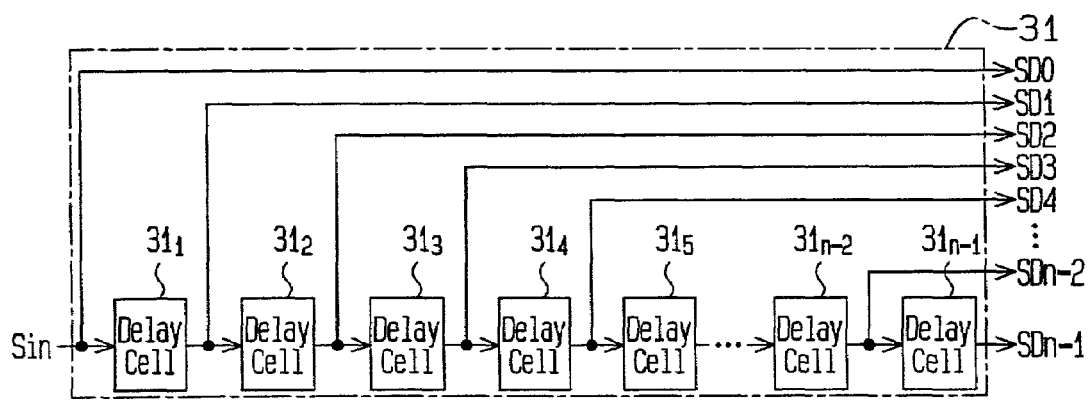
FIG. 9 is a schematic block diagram of a delay circuit of the delayed data selection circuit of FIG. 8.

As shown in FIG. 9, the delay circuit 31 includes a plurality (n−1) of delay cells $31_1$ to $31_{n-1}$. The delay cells $31_1$ to $31_{n-1}$ delay input signals by a predetermined time td and generate delayed data signals SD1 to SDn−1. The delay circuit 31 receives an output signal (read data signal) Sin from the input buffer 24 and generates n pieces of the delayed data signals SD0 to SDn−1 having individually different delay times to the output signal Sin. The first to nth delayed data signals SD0 to SDn−1 are provided to the optimum data detection circuit 33.

The output signal Sin (8-bit signal) of the input buffer 24 provided to the first stage of the first delay cell $31_1$ is output from the delay circuit 31 as the first delayed data signal SD0. The first delay cell $31_1$ receives the first delayed data signal SD0 and generates the second delayed data signal SD1. Similarly, the second delay cell $31_2$ generates the third delayed data signal SD2 from the second delayed data signal SD1, and the (n−1)th delay cell 31n−1 generates the nth delayed data signal SDn−1 from the (n−2)-th delayed data signal SD−2.

An expected value preset in the memory 1 is stored in the register 32. The expected value is read from the register 32 at timing calibration and is provided to the optimum data detection circuit 33 as an 8-bit comparison signal REF.

Figure 10:
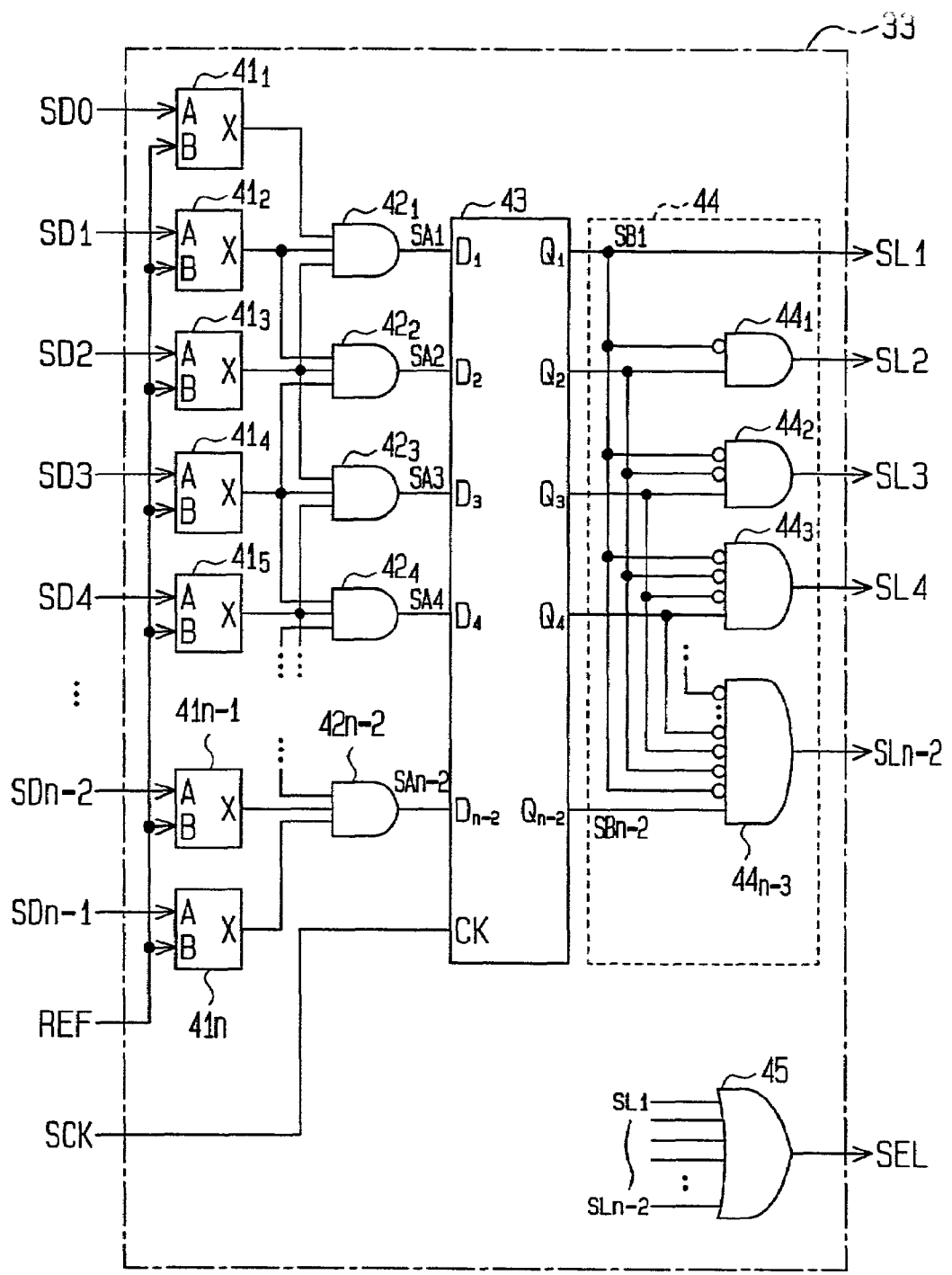
FIG. 10 is a schematic block diagram of an optimum data detection circuit of the delayed data selection circuit of FIG. 8.

As shown in FIG. 10, the optimum data detection circuit 33 includes n pieces of coincidence circuits $41_1$ to 41n, (n−2) pieces of AND circuits $42_1$ to 42n−1, a flip-flop 43, a priority circuit 44 and an OR circuit 45.

Each of the coincidence circuits $41_1$ to 41n, which is preferably an EOR circuit, receives two 8-bit input signals at two input terminals A, B and outputs a 1-bit operation result from an output terminal X by performing the EOR operation of the 8-bit input signals.

The delayed data signals SD0 to SDn−1 are respectively provided to the input terminal A of the coincidence circuits $41_1$ to 41n, and the comparison signal REF of the delayed data signals SD0 to SDn−1 is provided to the input terminals B. Therefore, each of the coincidence circuits $41_1$ to 41n outputs a high-level decision signal when the associated delayed data signal and comparison signal REF match.

The rising and falling edges of each of the delayed data signals SD0 to SDn−1 are delayed to the extent of the delay time td from the first delayed data signal SD0 to the nth delayed data signal SDn−1. Therefore, a high-level or low-level decision signal is output in the order of the coincidence circuits $41_1$ to 41n.

Each of the AND circuits $42_1$ to 42n−1, is preferably a 3-input AND circuit and receives the decision signals of the associated three coincidence circuits. Specifically, the decision signals of the first coincidence circuits $41_1$ to $41_3$ are provided to the first AND circuit $42_1$. The decision signals of the second to fourth coincidence circuits $41_2$ to $41_4$ are provided to the second AND circuit $42_2$. The decision signals of the (n−2)th to nth coincidence circuits 41n−2 to 41n are provided to the n−2 AND circuit 42n−2. AND output signals SA1 to SAn−2 of the AND circuits $42_1$ to 42n−2 are provided to the flip-flop circuit 43.

For example, when the AND output signal SA3 of the AND circuit $42_3$ is "1", all of the delayed data signals SD2, SD3, SD4 of the delay circuit 31 match the expected value. The number of AND circuits for outputting the AND output signal "1" is determined in accordance with the following conditions:

When td ≧ T−m×td>0; one,
When 2 td ≧ T−m×td>td; 2,
When 3 td ≧ T−m×td>2 td; 3
When 4 td ≧ T−m×td>3 td; 4,
When 5 td ≧ T−m×td>4 td; 5

Where, T is a clock cycle, m is the number of input of the AND circuits $42_1$ to 42n−1, and td is a delay time.

The flip-flop 43 latches the AND output signals SA1 to SAn−2 in accordance with a latch clock signal SCK and provides latch signals SB1 to SBn−2 to the priority circuit 44.

The priority circuit 44 includes gate circuits $44_1$ to 44n−3 with a number of the gate circuit smaller than a number of latch signals SB1 to SBn−2. Each of the gate circuits $44_1$ to 44n−2 receives a corresponding latch signal and latch signal (s) output earlier than the corresponding latch signal. Specifically, the first gate circuit $44_1$ receives the first and second latch signals SB1 and SB2, and the second gate $44_2$ receives the first to third latch signals SB1 to SB3.

Each of the gate circuits $44_1$ to 44n−3 performs the AND operation of a corresponding latch signal and an inverse signal of the latch signal(s) output earlier than the corresponding latch signal to generate a detection signal. Each of the gate circuits $44_1$ to 44n−3 outputs a low-level detection signal when the latch signal(s) output earlier than the corresponding latch signal is at the high level. For example, the first gate circuit $44_1$ outputs a low-level detection signal SL2 when the first and second latch signals SB1, SB2 are at the high level. The first gate circuit $44_1$ outputs a high-level detection signal SL2 when the first latch signal SB1 is at the low level and the second latch signal SB2 is at the high level. Detection signals SL2 to SLn−2 of the gate circuits $44_1$ to 44n−3 are provided to the selection circuit 35. The latch signal SB1 is provided to the selection circuit 35 as a detection signal SL1.

The priority circuit 44 receives the latch signals SB1 to SBn−2 and generates the detection signals SL1 to SLn−2 in which only one detection signal has preferentially the high level in accordance with the levels of the latch signals SB1 to SBn−2. The priority order of the detection signals corresponds to the order in which the latch signals SB1 to SBn−2 change. That is, the latch signals SB1 to SBn−2 rise to the high level in accordance with the order in which each of the delayed data signals SD0 to SDn−1 matches the comparison signal REF. Further, two or more of the latch signals SB1 to SBn−2 rise to the high level based on the relationship between the delay time td and pulse width of each of the delayed data signals SD0 to SDn−1. Among two or more high-level latch signals, the gate circuit, which corresponds to the latch signal rising to the high level at the earliest time, preferentially outputs a high-level detection signal. Therefore, the priority circuit 44 generates the detection signals SL1 to SLn−2 so that the delayed data signal, whose delay from the read data signal Sin is small, is selected among the plurality of delayed data signals SD0 to SDn−1.

The OR circuit 45 receives the detection signals SL1 to SLn−2 and performs the logical sum operation of the detection signals SL1 to SLn−2 to generate a detection termination signal SEL. The OR circuit 45 outputs a high-level detection termination signal SEL when any of the detection signals SL1 to SLn−2 rises to the high level.

As shown in FIG. 8, the control circuit 34 receives the internal clock signal ICLK, the correction signal CAL, the command issue signal RD and the detection termination signal SEL, and generates the latch clock signal SCK and the acknowledge signal ACK.

Figure 11:
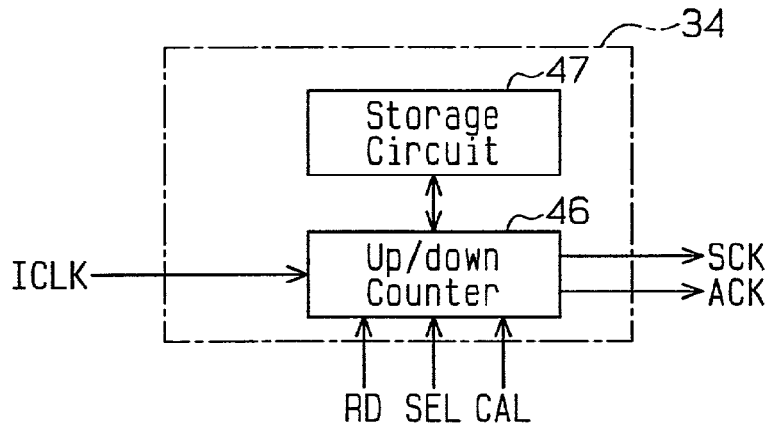
FIG. 11 is a schematic block diagram of a control circuit of the delayed data selection circuit of FIG. 8.

As shown in FIG. 11, the control circuit 34 includes an up/down counter 46 and a storage circuit 47. The internal clock signal ICKL, the correction signal CAL, the command issue signal RD, and the detection termination signal SEL are provided to the up/down counter 46.

The up/down counter 46 operates as an up counter in accordance with the correction signal CAL at timing calibration and operates as a down counter in the normal operation mode. At timing calibration, the counter 46 counts up the internal clock signal ICLK provided simultaneously with the start of read command issue in response to the command issue signal RD, and provides the internal clock signal ICLK to the flip-flop 43 as the latch clock signal SCK.

The flip-flop 43 latches the AND output signals SA1 to SAn−2 of the AND circuits 42$_1$ to 42$n$−2 in synchronism with the latch clock signal SCK (internal clock signal ICLK). The optimum data detection circuit 33 generates a high-level detection signal according to the timing of the internal clock signal ICLK, and the OR circuit 45 generates a high-level detection termination signal SEL.

The counter 46 of FIG. 11 stops a count operation in response to a high-level detection termination signal SEL and stores a count value (i.e., acquisition timing information) in a storage circuit 47. Further, the counter 46 stops the supply of the latch clock SCK in response to a high-level detection termination signal SEL. The flip-flop 43 holds the latch signals SB1 to SBn−2 when the latch clock signal is stopped. That is, when the control circuit 34 stops the supply of the latch clock signal SCK in response to the detection termination signal SEL, the flip-flop 43 stops a latch operation and holds the latch signals SB1 to SBn−2 at that time, thereby holding the detection signals SL1 to SLn−2. In other words, the optimum data detection circuit 33 holds a detection signal (i.e., supply timing information) when calibration is terminated. This means that the supply timing information is stored in the memory controller 21.

In the normal operation mode, the counter 46 reads a count value stored in the storage circuit 47 in response to the read command issue signal RD and counts down the count value in accordance with the internal clock issue signal ICLK. The counter 46 asserts the acknowledge signal ACK when the count value reaches "0". That is, the counter 46 asserts the acknowledge signal ACK at the input timing of a high-level detection termination signal SEL based on the count value stored in the storage circuit 47.

The selection circuit 35 receives the second to (n−1)th delayed data signals SD1 to SDn−2 and the detection signals SL1 to SLn−2 and selects a delayed data signal that corresponds to a high-level detection signal to output the selected delayed data signal as the read data signal S1. For example, when the first detection signal SLI is at the high level, the selection circuit 35 selects the second delayed data signal SD1 that corresponds to the first detection signal SL1 and outputs the second delayed data signal SD1 as read data RDATA 7:0.

Thus, the delayed data selection circuit 25 selects one delayed data signal matching an expected value and corresponds to the internal clock signal ICLK among the delayed data signals SD0 to SDn−1 and outputs the selected delayed data signal as read data RDATA 7:0. The read data RDATA 7:0 is delayed with the input signal Sin and corresponds to the internal clock signal ICLK. Therefore, even if a frequency of the internal clock signal is changed, the read data RDATA 7:0 corresponds to the changed frequency. Therefore, the function macro 4 stably acquires the read data RDATA 7:0 in accordance with the internal clock ICLK.

Figure 12:
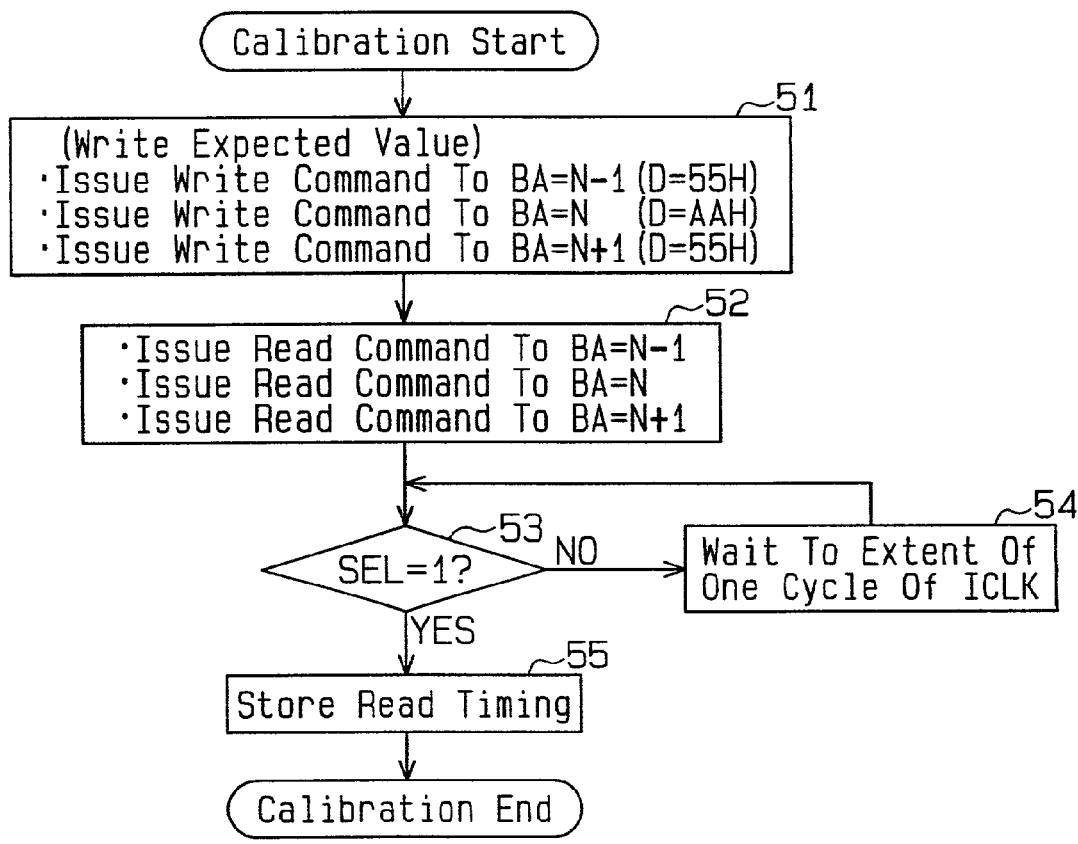
FIG. 12 is a flowchart for describing a calibration operation of the memory controller of FIG. 7.

FIG. 12 is a flowchart for describing the timing calibration processing in the memory controller 21 of FIG. 7.

First, when calibration is started, the memory controller 21 writes an expected value (for example, AAh) to the memory 1 at an optional address (BA=A) and writes an inverse value of the expected value (55h when the expected value is AAh) at an address (BA=N−1 or N+1) before and behind the optional address (step 51). The inverse value is written to prevent the incorrect determination of read data by specifying an expected value based on the inverse value. If the same data as the expected value is written at the address before and behind the address of the expected value, the calibration may be performed using the data differing from the original expected value.

Next, the memory controller 21 issues a read command against the expected value and inverse value stored in three addresses (step 52). The memory controller 21 determines whether the detection termination signal SEL from the optimum data detection circuit 33 is "1" (step 53). When the detection termination signal SEL is not "1", the memory controller 21 waits by one cycle of the internal clock signal ICLK (step 54) and returns to step 53. In steps 53, 54, the memory controller 21 awaits matching of read data and the expected value.

When the detection termination signal SEL is set to "1", the memory controller 21 stores read timing (step 55), and the count value of the counter 46 is stored in the storage circuit 47.

Figure 13:
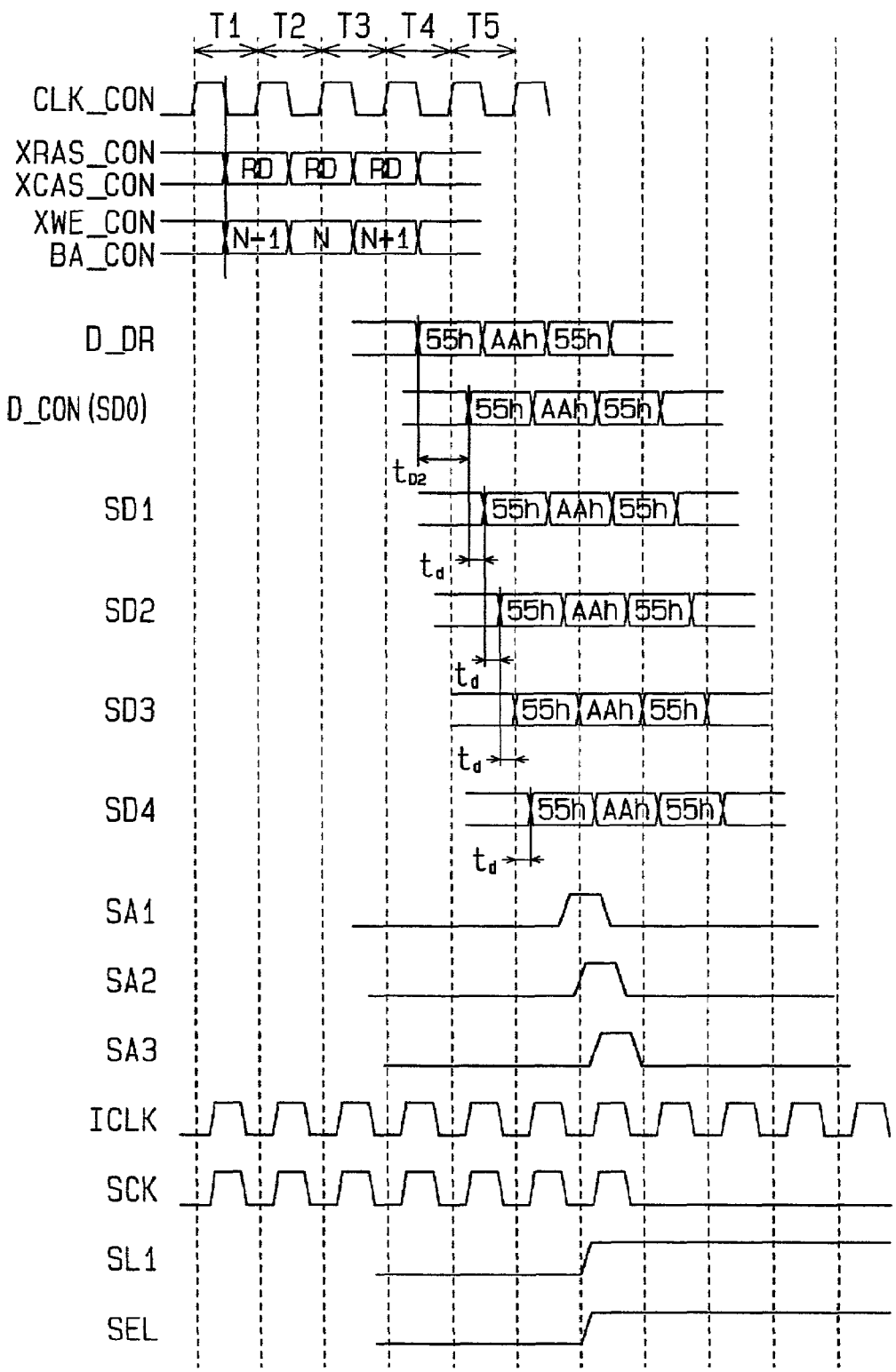
FIG. 13 is a timing chart for describing the operation of the memory controller of FIG. 7.

FIG. 13 describes the operation of the memory controller 21.

When a read command is issued to the memory 1 at the T1 to T3 cycles, read data D_DR is read from the memory 1 and read data D_CON is provided to the memory controller 21 behind a delay time tD2 after read commencement.

The memory controller 21 delays the read data D_CON (input signal Sin) by the delay time td and generates a plurality of (four in FIG. 13) delayed data signals SD1 to SD4. The memory controller 21 compares the delayed data signals SD0 to SD4 and an expected value and performs the AND operation of individual three comparison results to generates AND output signals SA1 to SA3.

The flip-flop 43 latches the AND output signals SA1 to SA3 in accordance with the latch clock signal SCK, and the priority circuit 44 uses a latch clock to generate the detection signal SL1. A detection termination signal SEL is generated by the logical sum operation of a detection signal. In response to the detection termination signal SEL, the selection circuit 35 selects a delayed data signal SD1 and outputs the selected delayed data signal SD1 as the read data RDATA 7:0. The memory controller 21 stores a count value of the counter 46 in the storage circuit 47 in response to the detection termination signal SEL. The control circuit 34 stops the latch clock signal SCK in response to the detection termination signal SEL, so that the flip-flop 43 holds the latch signals SB1 to SBn−2, thereby holding the detection signals SL1 to SLn−2 of the optimum data detection circuit 33.

In the normal operation, the memory controller 21 asserts the acknowledge signal ACK in accordance with the count value stored in the storage circuit 47. By supplying a read data signal S1 to the function macro 4 in this manner, at least the tD setup and hold times are secured for an internal clock signal ICLK. Therefore, the function macro 4 stably acquires the read data RDATA 7:0 in accordance with the internal clock signal ICLK.

The memory controller 21 of the present embodiment has the following advantages:

(1) The controller 22, in the timing calibration processing, issues a read command to the memory 1 and provides the calibration signal CAL to the delayed data selection circuit 25. The delayed data selection circuit 25 receives a data signal Sin read from the memory 1 in accordance with the read command and generates supply timing information using the data signal Sin. In the normal operation mode, the delayed data selection circuit 25 adjusts the supply timing of the read data RDATA 7:0 to the function macro 4 based on the supply timing information. Therefore, the read data RDATA 7:0 is provided from the delayed data selection circuit 25 to the function macro 4 at the timing at which the function macro 4 can be acquired. As a result, regardless of a change of an environmental condition or a change of a clock frequency, the function macro 4 stably acquires read data.

(2) The delayed data selection circuit 25 includes the delay circuit 31, the optimum data detection circuit 33, the control circuit 34 and the selection circuit 35. The delay circuit 31 delays a read signal Sin read from the memory 1 and generates a plurality of delayed data signals SD0 to SDn−1 in which each signal has a different delay time. The optimum data detection circuit 33 compares the delayed data signals SD0 to SDn−1 and an expected value and detects a delayed data signal most suitable for the acquisition timing of the function macro 4 from the delayed data signals matching the expected value in synchronism with the latch clock signal SCK to generate the detection signals SL1 to SLn−2. The optimum data detection circuit 33 further generates the detection termination signals SEL of the detection signals SL1 to SLn−2. The selection circuit 35 selects a delayed data signal corresponding to the detection signal from the delayed data signals and outputs the read data signal S1. The control circuit 34 provides the latch clock signal SCK synchronizing with the internal clock signal ICLK to the optimum data detection circuit 33 in the timing calibration processing. The control circuit 34 stops the supply of the latch clock signal SCK in response to the detection termination signal SEL and stops the operation of the optimum data detection circuit 33. As a result, the optimum supply timing of read data is easily detected. Furthermore, when the latch clock signal SCK is stopped by the detection termination signal SEL, the flip-flop 43 holds the latch signals SB1 to SBn−2, thereby holding the detection signals SL1 to SLn−2 of the optimum data detection circuit 33.

(3) The control circuit 34 includes the up/down counter 46 and the storage circuit 47. The counter 46 counts up the internal clock signal ICLK in the timing calibration processing in response to the calibration signal CAL and stores a count value in the storage circuit 47 in response to the detection termination signal SEL. The counter 46 counts down the count value read from the storage circuit 47 in response to the command issue signal RD in the normal operation mode. When the count value reaches "0", the acknowledge signal ACK is asserted. As a result, the acknowledge signal ACK is easily asserted matching the data supply timing into the function macro 4.

(4) The memory controller 21 writes an expected value at a predetermined address of the memory 1 and writes an inverse value of the expected value at the address before and behind the predetermined address. Therefore, the read timing of the expected value is accurately detected, and the incorrect adjustment of the read data supply timing is prevented.

It should be apparent to those skilled in the art that the present invention may be embodied in many other specific forms without departing from the spirit or scope of the invention. Particularly, it should be understood that the invention may be embodied in the following forms.

The timing calibration processing may be performed at proper timing, such as initialization of the LSI 2, every predetermined time at operation of the LSI 2, clock frequency change or temperature change detection.

In the timing calibration processing, calibration data may be stored as described below instead of writing the calibration data from the memory controller 21 to the memory 1. As shown in FIG. 14, storage areas 62, 63 and 64 of the calibration data are defined in a memory area 61 of the memory 1. In this case, writing of an expected value in step 51 of FIG. 12 may be performed only at the initial timing calibration timing. In this method, the timing calibration processing is shortened when the timing calibration processing is executed at optional timing.

The timing calibration processing may periodically be executed to the memory 1 (DRAM). In this case, desirably, the timing calibration processing should be performed concerning all of low addresses within a fixed time (specification of the DRAM refresh time) by changing the low addresses every processing and accessing the memory 1. For example, FIG. 15 shows a DRAM having the number of rows R and the number of columns C. In this case, calibration is performed R times while changing the low addresses. This calibration can omit refreshing of the memory 1. This is because all of the low addresses are set active within a fixed time for refresh.

The timing calibration processing may be performed in units of optional bits exceeding one bit without being limited to units of eight bits.

The priority circuit 44 may take preference over the latch signal risen to the high level in the second place among the latch signals SB1 to SBn−2 of the flop-flip 43, for example. In this case, a margin of the read data supply timing can be obtained.

Figure 16:
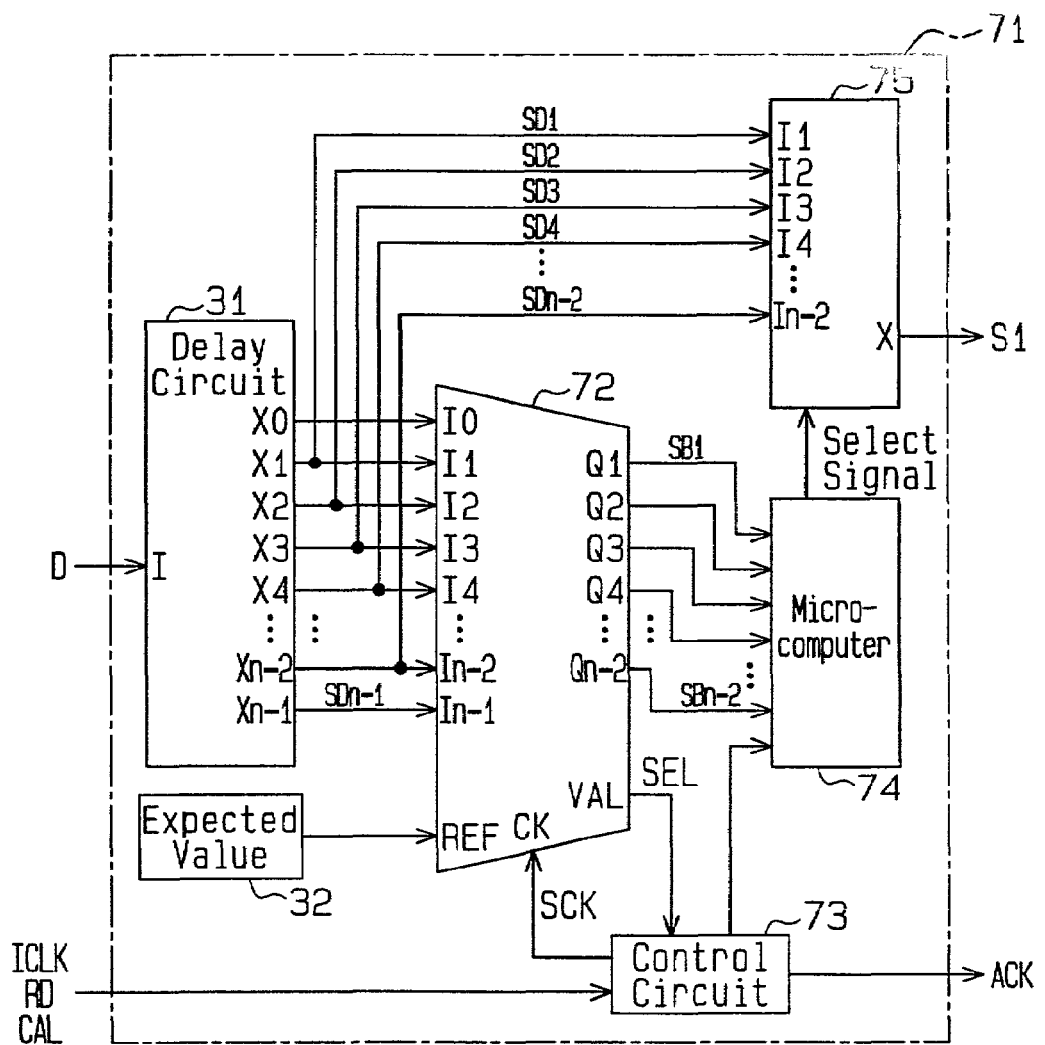
FIG. 16 is a schematic block diagram of an alternative delayed data selection circuit.
Figure 17:
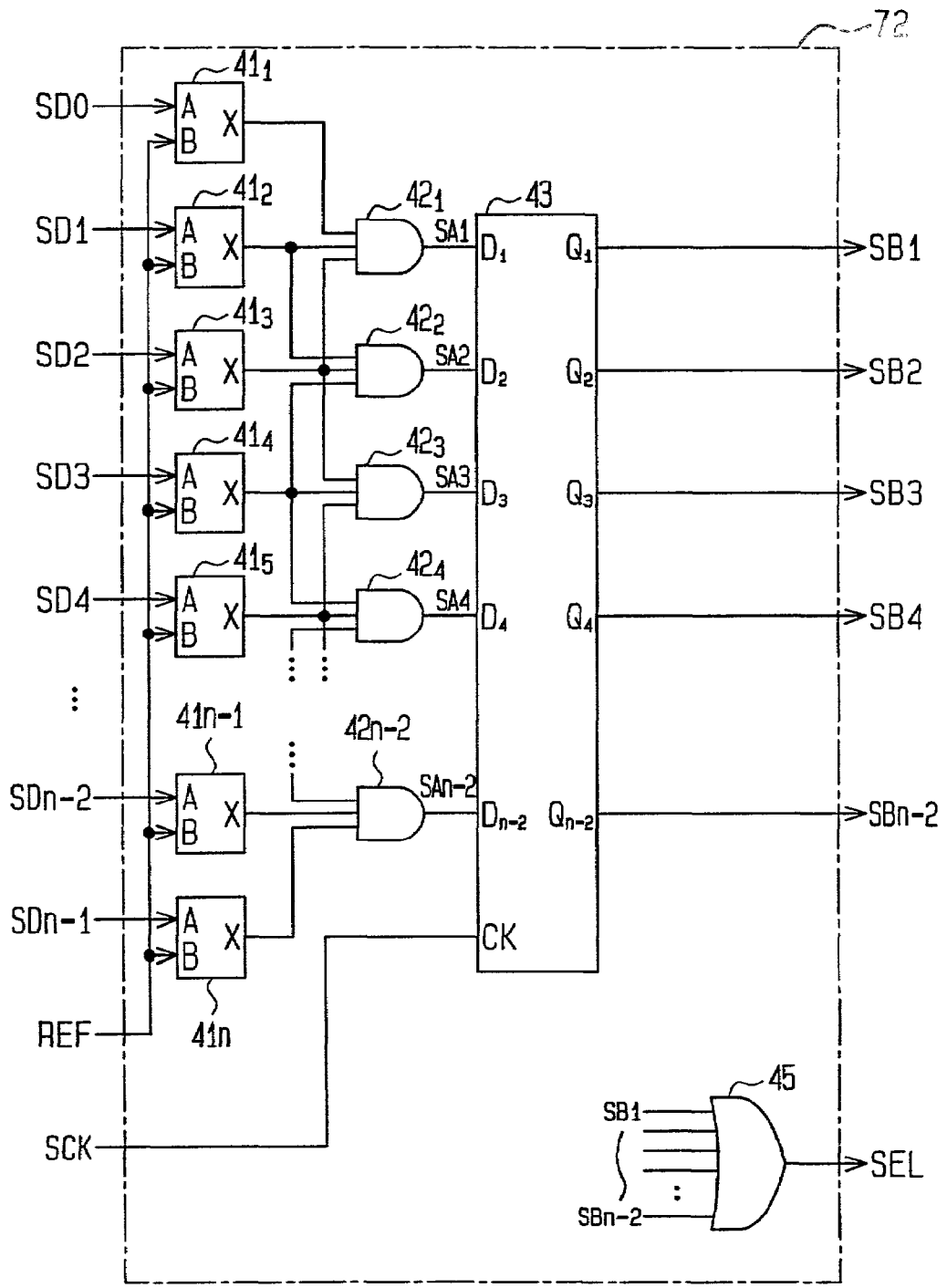
FIG. 17 is a schematic block diagram of the optimum data detection circuit of FIG. 16.

The delayed data selection circuit 25 may be replaced with a delayed data selection circuit 71 as shown in FIG. 16, for example. The delayed data selection circuit 71 includes the delay circuit 31, the register 32, a matching detection circuit 72, a control circuit 73, a microcomputer 74 and a selection circuit 75. The matching detection circuit 72 does not have the priority circuit 44 as shown in FIG. 17. The matching detection circuit 72 detects whether the delayed data signals SD0 to SDn−1 and an expected value read from the register 72 match and provides the detection signals SB1 to SBn−2 to the microcomputer 74. The OR circuit 45 performs the logical sum operation of the detection signals SB1 to SBn−2 and provides the detection termination signal SEL to the control circuit 73.

The control circuit 73 stops the supply of the latch clock signal SCK in response to the detection termination signal SEL and stops the operation of the flip-flop 43. The control circuit 73 counts down a count value in the normal operation mode and asserts the acknowledge signal ACK.

The microcomputer 74 execute the program that determines which delayed data is selected using the detection signals SB1 to SBn−2 and provides a select signal to the selection circuit 75. The selection circuit 75 selects one of the delayed data signals SD1 to SDn−2 in accordance with the select signal and outputs the selected delayed data signal S1.

The CPU 3 may be mounted on a semiconductor substrate differing from the semiconductor substrate of the LSI 2.

The correction signal CAL may be provided from a signal generation circuit installed in the CPU 3 or the LSI 2, for example, other than the control circuit 22, or the external circuit of the LSI 2.

The number of input terminals of the AND circuits $42_1$ to $42n-2$ of the optimum data detection circuit 33 (matching detection circuit 72) may be changed. For example, a 4-input AND circuit generates a high-level AND output signal when four delayed data signals match an expected value. As the number of input terminals increases, the setup and hold times that can be secured also increase.

A flip-flop holding the detection signals SL1 to SLn−2 may be connected between the optimum data detection circuit 33 and the selection circuit 35 by omitting the flip-flop 43 of the optimum data detection circuit 33.

Figure 18:
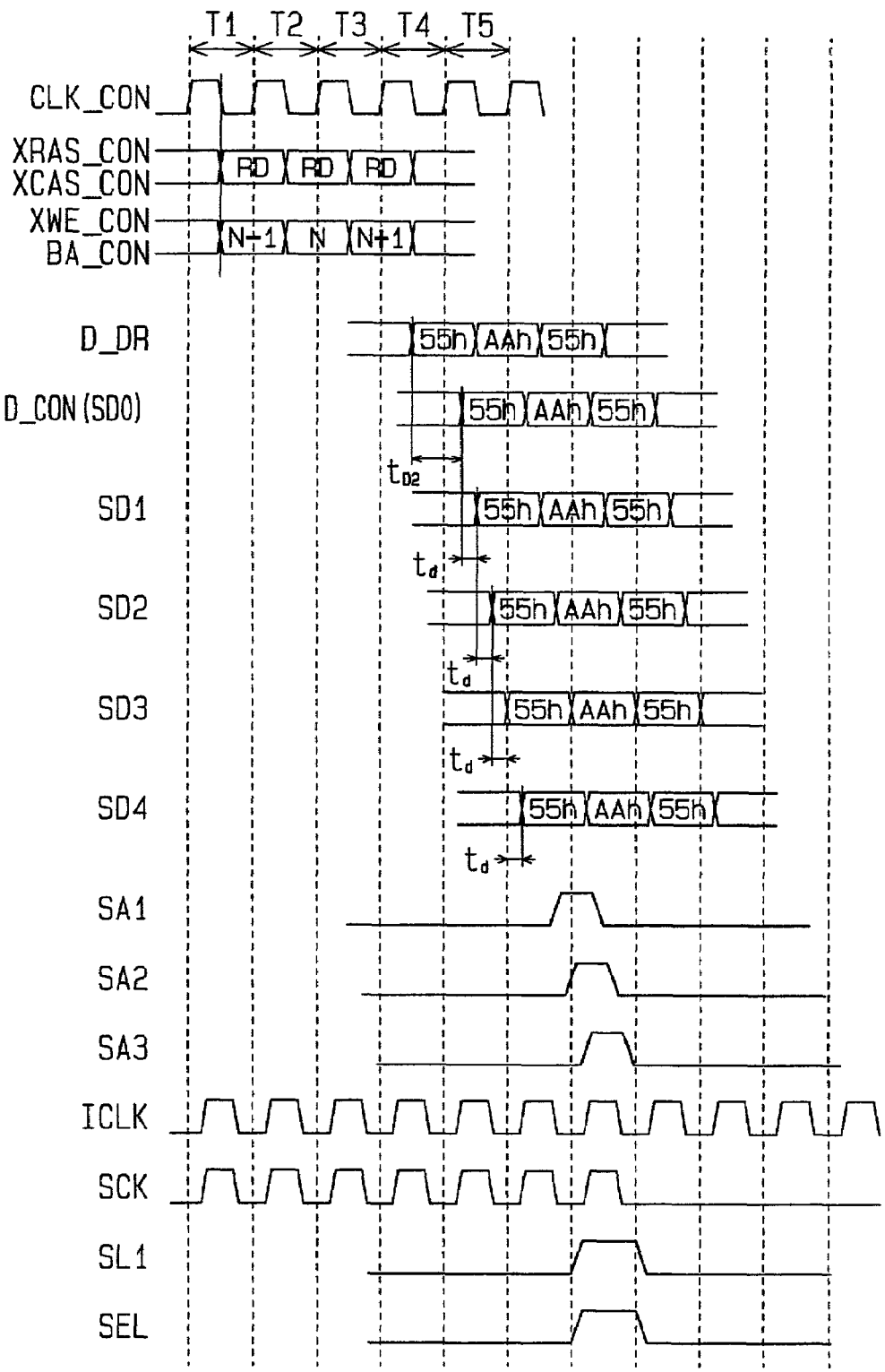
FIG. 18 is a timing chart for describing an alternative operation of the memory controller of FIG. 7

As shown in FIG. 18, the detection signals SL1 to SLn−2 and the detection termination signal SEL may be pulse signals. In this case, however, it is necessary to hold the detection signals SL1 to SLn−2. Accordingly, a latch circuit may be provided between the flip-flop 43 and the priority circuit 44 or between the priority circuit 44 and the selection circuit 35. In this case, the internal clock ICLK is provided to the flip-flop 43, a latch signal based on the detection termination signal SEL is provided to the latch circuit, and the detection signals SL1 to SLn−2 are held by the latch circuit when the detection termination signal SEL is changed.

The CPU 3 may store an expected value in the register 32 instead of prestoring the expected value in the register 32. Further, the memory controller 21 or the CPU 3 may write the expected value stored in the register 32 to the memory 1.

The control circuit 34 may stop the operation of the coincidence circuits $41_1$ to $41n$, for example. Further, the control circuit 34 may stop the operations of the flip-flop 43 and the coincidence circuits $41_1$ to $41n$.

Therefore, the present examples and embodiments are to be considered as illustrative and not restrictive and the invention is not to be limited to the details given herein, but may be modified within the scope and equivalence of the appended claims.

What is claimed is:

1. A method for supplying a data signal read from a memory to an internal circuit of a semiconductor integrated circuit, the method comprising the steps of:

generating supply timing information for determining supply timing of the data signal to the internal circuit on the basis of a result of matching a delayed data signal with an expected value; and supplying the data signal read from the memory to the internal circuit in accordance with the supply timing information, wherein the step of generating the supply timing information includes:

generating a plurality of delayed data signals by delaying the data signal to an extent of a plurality of different delay times;

detecting a specific delayed data signal suitable for the supply timing of the data signal to the internal circuit among the plurality of delayed data signals in accordance with an internal clock signal; and storing the detection of the specific delayed data signal as the supply timing information, and wherein the step of supplying the data signal includes:

selecting one of the plurality of delayed data signals that corresponds to the detected specific delayed data signal in accordance with the supply timing information; and providing the selected delayed data signal to the internal circuit.

2. A method for supplying a data signal read from a memory to an internal circuit of a semiconductor integrated circuit, the method comprising the steps of:

comparing the data signal read from the memory and an expected value to generate the supply timing information for determining supply timing of the data signal to the internal circuit based on the comparison result;

supplying the data signal read from the memory to the internal circuit in accordance with the supply timing information;

counting an internal clock signal until the comparison result is obtained after reading of the data signal from the memory is started;

storing a count value as the acquisition timing information; and supplying a receiving signal indicative of the acquisition timing of the selected delayed data signal to the internal circuit in accordance with an acquisition timing information.

3. A method for supplying a data signal read from a memory to an internal circuit of a semiconductor integrated circuit, the method comprising the steps of:

generating supply timing information for determining supply timing of the data signal to the internal circuit on the basis of a result of matching a delayed data signal with an expected value;

supplying the data signal read from the memory to the internal circuit in accordance with the supply timing information.

4. A method for supplying a data signal read from a memory to an internal circuit of a semiconductor integrated circuit, the method comprising the steps of:

generating supply timing information for determining supply timing of the data signal to the internal circuit on the basis of a result of matching a delayed data signal with an expected value; and supplying the data signal read from the memory to the internal circuit in accordance with the supply timing information, wherein the step of generating the supply timing information includes:

generating a plurality of delayed data signals by delaying the data signal to an extent of the plurality of different delay times;

comparing the plurality of delayed data signals and an expected value;

generating a plurality of decision signals indicative of the matching between the plurality of delayed data signals and the expected value in synchronism with an internal clock signal;

detecting a specific delayed data signal suitable for the supply timing of the data signal to the internal circuit using the plurality of decision signals to generate a detection signal; and storing the detection signal as the supply timing information, and wherein the step of supplying the data signal includes:

generating the acquisition timing information that corresponds to the supply timing information using the internal clock signal;

temporarily storing the acquisition timing information; and supplying a receiving signal indicative of the acquisition timing of the selected delayed data signal to the internal circuit in accordance with the acquisition timing information, wherein the step of generating the supply timing information includes:

generating a plurality of delayed data signals by delaying the data signal to an extent of the plurality of different delay times;

detecting a specific delayed data signal suitable for the supply timing of the data signal to the internal circuit among the plurality of delayed data signals in accordance with an internal clock signal; and storing the detection of the specific detected delayed data signal as the supply timing information, and wherein the step of supplying the data signal includes:

selecting one of the plurality of delayed data signals corresponding to the detected specific delayed data signal in accordance with the supply timing information; and providing the selected delayed data signal to the internal circuit selecting one of the plurality of delayed data signals corresponding to the detected specific delayed data signal in accordance with the supply timing information, and providing the selected delayed data signal to the internal circuit.

5. A method for supplying a data signal read from a memory to an internal circuit of a semiconductor integrated circuit, the method comprising the steps of:

generating supply timing information for determining supply timing of the data signal to the internal circuit on the basis of a delayed data signal and an expected value;

supplying the data signal read from the memory to the internal circuit in accordance with the supply timing information, wherein the step of generating the supply timing information includes:

generating a plurality of delayed data signals by delaying the data signal to an extent of the plurality of different delay times;

comparing the plurality of delayed data signals and an expected value;

generating a plurality of decision signals indicative of the matching between the plurality of delayed data signals and the expected value in synchronism with an internal clock signal;

detecting a specific delayed data signal suitable for the supply timing of the data signal to the internal circuit using the plurality of decision signals to generate a detection signal; and storing the detection signal as the supply timing information, and wherein the step of supplying the data signal includes:

selecting one of the plurality of delayed data signals corresponding to the detected specific delayed data signal in accordance with the supply timing information, and providing the selected delayed data signal to the internal circuit;

writing a first data corresponding to the expected value in the memory at a predetermined first address;

writing a second data differing from the first data at a second address before the predetermined address and a third address after the predetermined address;

continuously reading the first and second data written at the first address to the third address; and specifying the first data based on the second data, wherein the step of generating the supply timing information is performed using the first data.

6. A memory controller providing a data signal read from a memory to an internal circuit of a semiconductor integrated circuit, comprising:

a control circuit connected to the memory for providing a read request signal for reading the data signal to the memory; and a data selection circuit connected to the memory for receiving the data signal read from the memory in response to the read request signal and generating supply timing information for determining supply timing of the data signal to the internal circuit on the basis of a result of matching a delayed signal with an expected value, wherein the data selection circuit includes:

a delay circuit for delaying the data signal to an extent of a plurality of different delay times and generating a plurality of delayed data signals;

an optimum data detection circuit connected to the delay circuit for comparing the plurality of delayed data signals and an expected value and detecting a specific delayed data signal suitable for the supply timing of the data signal to the internal circuit based on a comparison result to generate a detection signal, wherein the optimum data detection circuit generates a detection termination signal simultaneously with the detection signal;

a selection circuit connected to the delay circuit and the optimum data detection circuit for selecting one of the plurality of delayed data signals corresponding to the detected specific delayed data signal in accordance with the detection signal; and a control circuit connected to the optimum data detection circuit for stopping the operation of the optimum data detection circuit in response to the detection termination signal.

7. A memory controller providing a data signal read from a memory to an internal circuit of a semiconductor integrated circuit, comprising:
a control circuit connected to the memory for providing a read request signal for reading the data signal to the memory; and
a data selection circuit connected to the memory for receiving the data signal read from the memory in response to the read request signal and generating supply timing information for determining supply timing of the data signal to the internal circuit on the basis of a delayed data signal and an expected value,
wherein the data selection circuit includes:
a delay circuit for delaying the data signal to an extent of a plurality of different delay times and generating a plurality of delayed data signals;
an optimum data detection circuit connected to the delay circuit for comparing the plurality of delayed data signals and an expected value and detecting a specific delayed data signal suitable for the supply timing of the data signal to the internal circuit based on a comparison result to generate a detection signal, wherein the optimum data detection circuit generates a detection termination signal simultaneously with the detection signal;
a selection circuit connected to the delay circuit and the optimum data detection circuit for selecting one of the plurality of delayed data signals corresponding to the detected specific delayed data signal in accordance with the detection signal; and
a control circuit connected to the optimum data detection circuit for stopping the operation of the optimum data detection circuit in response to the detection terminal signal,
wherein the control circuit includes:
a counter for counting up an internal clock signal in response to a correction signal and stopping the count-up operation in response to the detection termination signal; and
a storage circuit connected to the counter for storing the count-up value of the counter, wherein the counter receives the count value from the storage circuit in response to a read command issue signal and counts down the count value, and wherein the counter provides a receiving signal indicative of the acquisition timing of the selected delayed data signal to the internal circuit when the count value reaches a predetermined value.

8. A memory controller providing a data signal read from a memory to an internal circuit of a semiconductor integrated circuit, comprising:
a control circuit connected to the memory for providing a read request signal for reading the data signal to the memory; and
a data selection circuit connected to the memory for receiving the data signal read from the memory in response to the read request signal and generating supply timing information for determining supply timing of the data signal to the internal circuit on the basis of a delayed data signal and an expected value,
wherein the data selection circuit includes:
a delay circuit for delaying the data signal to an extent of a plurality of different delay times and generating a plurality of delayed data signals;
an optimum data detection circuit connected to the delay circuit for comparing the plurality of delayed data signals and an expected value and detecting a specific delayed data signal suitable for the supply timing of the data signal to the internal circuit based on a comparison result to generate a detection signal, wherein the optimum data detection circuit generates a detection termination signal simultaneously with the detection signal;
a selection circuit connected to the delay circuit and the optimum data detection circuit for selecting one of the plurality of delayed data signals corresponding to the detected specific delayed data signal in accordance with the detection signal; and
a control circuit connected to the optimum data detection circuit for stopping the operation of the optimum data detection circuit in response to the detection termination signal,
wherein the optimum data detection circuit includes:
a plurality of coincidence circuits connected to the delay circuit, each coincidence circuit receiving the associated delayed data signal and the expected value and generating a decision signal;
a plurality of AND circuits connected to the plurality of coincidence circuits for receiving the plurality of decision signals and generating a plurality of AND output signals;
a flip-flop connected to the plurality AND circuits for receiving the plurality of AND output signals in accordance with the internal clock signal;
a priority circuit connected to the flip-flop for generating a detection signal of a specific delayed data signal suitable for the supply timing of the data signal to the internal circuit in accordance with the output sequence of the plurality of received AND output signals; and
an OR circuit connected to the priority circuit for performing a logical sum operation of the plurality of detection signals and generating the detection termination signal.

9. A memory controller providing a data signal read from a memory to an internal circuit of a semiconductor integrated circuit, comprising:
a control circuit connected to the memory for providing a read request signal for reading the data signal to the memory; and
a data selection circuit connected to the memory for receiving the data signal read from the memory in response to the read request signal and generating supply timing information for determining supply timing of the data signal to the internal circuit on the basis of a result of matching a delayed data signal with an expected value,
wherein the data selection circuit includes:
a delay circuit for delaying the data signal by the plurality of different delay times and generating a plurality of detection signals;
a coincidence detection circuit connected to the delay circuit for comparing the plurality of delayed data signals and an expected value and generating a plurality of detection signals indicative of a comparison result, wherein the coincidence detection circuit generates the detection termination signal simultaneously with the plurality of detection signals;
a microcomputer connected to the coincidence detection circuit for generating a select signal for selecting a specific delayed data signal suitable for the supply timing of the data signal to the internal circuit using the plurality of detection signals;

a selection circuit connected to the delay circuit and the microcomputer for selecting one of the plurality of delayed data signals in accordance with the select signal; and a control circuit connected to the coincidence detection circuit for stopping the operation of the coincidence detection circuit in response to the detection termination signal.

10. A memory controller providing a data signal read from a memory to an internal circuit of a semiconductor integrated circuit, comprising:

a control circuit connected to the memory for providing a read request signal for reading the data signal to the memory; and a data selection circuit connected to the memory for receiving the data signal read from the memory in response to the read request signal and generating supply timing information for determining supply timing of the data signal to the internal circuit on the basis of a delayed data signal and an expected value, wherein the memory controller writes a first data corresponding to an expected value in the memory at a predetermined first address and writes a second data differing from the first data at a second address before the predetermined address and a third address after the predetermined address, and wherein the memory controller continuously reads the first and second data written at the first to third addresses and specifies the first data provided to the data selection based on the read second data.

11. A semiconductor integrated circuit device accessing to a memory, comprising:

an internal circuit; and a memory controller connected between the memory and the internal circuit for providing a data signal read from the memory to the internal circuit, the memory controller including:

a control circuit connected to the memory for providing a read request signal for reading the data signal to the memory; and a data selection circuit connected to the memory for receiving the data signal read from the memory in response to the read request signal and generating supply timing information for determining the supply timing of the data signal to the internal circuit on the basis of a result of matching a delayed data signal with an expected value, wherein the data selection circuit includes:

a delay circuit for delaying the data signal to an extent of a plurality of different delay times and generating a plurality of delayed data signals;

an optimum data detection circuit connected to the delay circuit for comparing the plurality of delayed data signals and an expected value and detecting a specific delayed data signal suitable for the supply timing of the data signal to the internal circuit based on a comparison result to generate a detection signal; and a selection circuit connected to the delay circuit and the optimum data detection circuit for selecting one of the plurality of delayed data signals corresponding to the detected specific delayed data signal in accordance with the detection signal.

12. A method for supplying a data signal read from a memory to an internal circuit of a semiconductor integrated circuit, the method comprising the steps of:

delaying the data signal with a plurality of different delay values to generate a plurality of delayed data signals;

determining a supply timing of the data signal to the internal circuit by matching at least one delayed data signal with an expected value; and supplying the data signal read from the memory to the internal circuit in accordance with the supply timing, wherein the step of determining the supply timing includes:

detecting a specific delayed data signal suitable for the supply timing of the data signal to the internal circuit among the plurality of delayed data signals in accordance with an internal clock signal; and storing the detection of the specific delayed data signal as the determined supply timing, and wherein the step of supplying the data signal includes:

selecting one of the plurality of delayed data signals that corresponds to the detected specific delayed data signal in accordance with the determined supply timing; and providing the selected delayed data signal to the internal circuit.

13. The method of claim 12, wherein the step of determining the supply timing includes comparing the plurality of delayed data signal with an expected value.

14. A memory controller providing a data signal read from a memory to an internal circuit of a semiconductor integrated circuit, comprising:

a control circuit connected to the memory for providing a read request signal for reading the data signal to the memory; and a data selection circuit connected to the memory for receiving the data signal read from the memory in response to the read request signal and delaying the data signal with a plurality of different delay values to generate a plurality of delayed data signals, wherein the data selection circuit determines a supply timing of the data signal to the internal circuit by matching at least one delayed data signal with an expected value, and wherein the data selection circuit includes:

a delay circuit for delaying the data signal to an extent of a plurality of different delay times and generating a plurality of delayed data signals;

an optimum data detection circuit connected to the delay circuit for comparing the plurality of delayed data signals and an expected value and detecting a specific delayed data signal suitable for the supply timing of the data signal to the internal circuit based on a comparison result to generate a detection signal; and a selection circuit connected to the delay circuit and the optimum data detection circuit for selecting one of the plurality of delayed data signals corresponding to the detected specific delayed data signal in accordance with the detection signal.

15. The memory controller of claim 14, wherein the data selection circuit compares the plurality of delayed data signals with an expected value.

16. A semiconductor integrated circuit device accessing to a memory, comprising:

an internal circuit; and a memory controller connected between the memory and the internal circuit for providing a data signal read from the memory to the internal circuit, the memory controller including:

a control circuit connected to the memory for providing a read request signal for reading the data signal to the memory; and a data selection circuit connected to the memory for receiving the data signal read from the memory in response to the read request signal and delaying the data signal with a plurality of different delay values to generate a plurality of delayed data signals, wherein the data selection circuit determines a supply timing of the data signal to the internal circuit by matching at least one delayed data signal with an expected value, and wherein the data selection circuit includes;

a delay circuit for delaying the data signal to an extent of a plurality of different delay times and generating a plurality of delayed data signals;

an optimum data detection circuit connected to the delay circuit for comparing the plurality of delayed data signals and an expected value and detecting a specific delayed signal suitable for the supply timing of the data signal to the internal circuit based on a comparison result to generate a detection signal; and a selection circuit connected to the delay circuit and the optimum data detection circuit for selecting one of the plurality of delayed data signals corresponding to the detected specific delayed data signal in accordance with the detection signal.

17. The semiconductor integrated circuit device of claim 16, wherein the data selection circuit compares the plurality of delayed data signals with an expected value.

18. A memory controller providing a data signal read from a memory to an internal circuit of a semiconductor integrated circuit, comprising:

a control circuit connected to the memory for providing a read request signal for reading the data signal to the memory; and a data selection circuit connected to the memory for receiving the data signal read from the memory in response to the read request signal and generating supply timing information for determining supply timing of the data signal to the internal circuit by delaying the data signal, wherein the memory controller writes a first data corresponding to an expected value in the memory at a predetermined first address and writes a second data differing from the first data at a second address before the predetermined address and a third address after the predetermined address, and wherein the memory controller continuously reads the first and second data written at the first to third addresses and specifies the first data provided to the data selection based on the read second data.

19. A method for supplying a data signal read from a memory to an internal circuit of a semiconductor integrated circuit, the method comprising the steps of:

generating supply timing information for determining supply timing of the data signal to the internal circuit by delaying the data signal and matching the delayed data signal with an expected value; and supplying the data signal read from the memory to the internal circuit in accordance with the supply timing information, wherein the step of generating the supply timing information includes:

generating a plurality of delayed data signals by delaying the data signal to an extent of a plurality of different delay times;

detecting a specific delayed data signal suitable for the supply timing of the data signal to the internal circuit among the plurality of delayed data signals in accordance with an internal clock signal; and storing the detection of the specific delayed data signal as the supply timing information, and wherein the step of supplying the data signal includes:

selecting one of the plurality of delayed data signals that corresponds to the detected specific delayed data signal in accordance with the supply timing information; and providing the selected delayed data signal to the internal circuit.

* * * * *